United States Patent [19]

Burnham

[11] 4,142,811
[45] Mar. 6, 1979

[54] ONE-PIECE LOCKING AND RELEASING HUB ACTUATED WITH THRUST-MULTIPLYING SCREW ASSEMBLY

[76] Inventor: J. Kellogg Burnham, Av. Republicas 153-BIS, Mexico City, Mexico

[21] Appl. No.: 795,215

[22] Filed: May 9, 1977

[30] Foreign Application Priority Data

May 31, 1976 [MX] Mexico .................................. 164778
Jun. 21, 1976 [MX] Mexico .................................. 165202
Nov. 11, 1976 [MX] Mexico .................................. 166985
Nov. 30, 1976 [MX] Mexico .................................. 167236

[51] Int. Cl.² ............................................. F16B 2/02
[52] U.S. Cl. .................................... 403/290; 403/354; 403/373; 85/1 R
[58] Field of Search ............... 403/373, 354, 362, 290; 85/1 SS, 1 R

[56] References Cited

U.S. PATENT DOCUMENTS

| 1,447,448 | 3/1923 | Walch | 85/1 SS |
| 2,042,783 | 6/1936 | Hall | 85/1 R |
| 2,999,394 | 9/1961 | Firth | 403/373 X |
| 3,267,519 | 8/1966 | Albert | 85/1 R |
| 3,281,170 | 10/1966 | Kaplan | 403/373 |
| 3,445,130 | 5/1969 | Obenshain | 403/373 X |
| 3,461,769 | 8/1969 | Brosseit | 85/1 R |
| 3,724,367 | 4/1973 | Pasinski | 403/373 X |
| 3,876,318 | 4/1975 | Crispell | 403/362 X |

FOREIGN PATENT DOCUMENTS 27807 of 1907 United Kingdom ..................... 403/290

Primary Examiner—Andrew V. Kundrat
Attorney, Agent, or Firm—O'Brien and Marks

[57] ABSTRACT

Hub which may be integral with a pulley, gear, sprocket, etc. has keyhole slots extending radially from its bore into a hub body lengthwise of the hub, with a perpendicular screw and sleeve screw across said slots to compress them and reduce the hub bore opening to clamp the hub onto a shaft, and to expand such slots to release the hub from the shaft; a headless screw immobilized in threads below the slot extends into the coaxial sleeve screw above the slot having external and internal threads of different but proximate pitch, rotation of which applies greatly multiplied thrust upon the screw to push or pull the hub body below the slot; other embodiments include an internal annular slot in the hub bore compressed by an axially placed screw assembly or screw along, and diametral slots similarly compressed and expanded, and a dual thread screw with differential pitch.

8 Claims, 7 Drawing Figures

FIG. 4
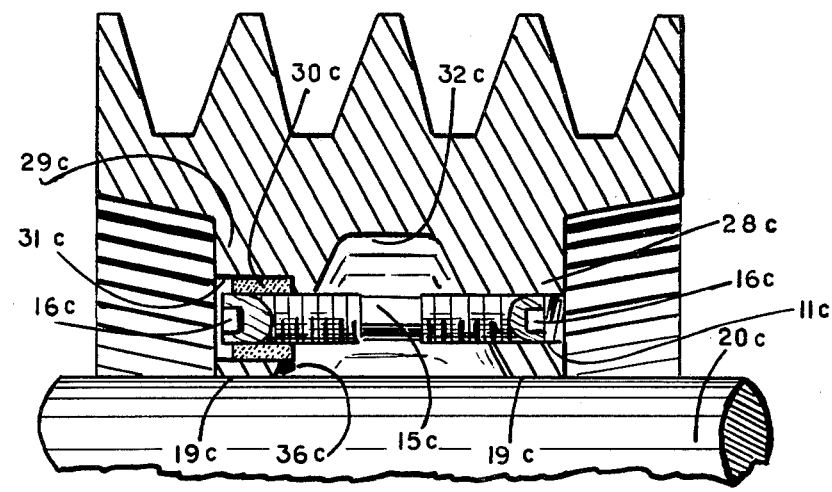
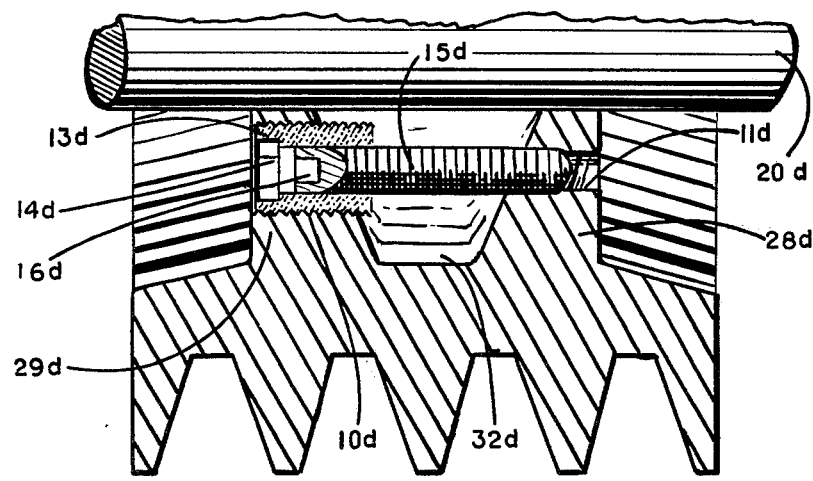
FIG. 5

ONE-PIECE LOCKING AND RELEASING HUB ACTUATED WITH THRUST-MULTIPLYING SCREW ASSEMBLY

CROSS-REFERENCES

I claim priority based on the following co-pending applications for Mexican patent:

Exp. 164,778-P
Filing date: May 31, 1976
"CONJUNTO DE TORNILLO MULTIPLICADOR DE FUERZA" ('Force-Multiplying Screw Assembly');

Exp. 165,202-P
Filing date: June 21, 1976
"MEJORAS EN UN CONJUNTO DE TORNILLO MULTIPLICADOR DE FUERZA AXIAL" ('Improvements in Screw Assembly Multiplying Axial Force');

Exp. 166,985-P
Filing date: Nov. 11, 1976
"MEJORAS EN PRENSAS Y EXTRACTORES MANUALES PARA AUMENTOR APRIETE Y SOSTENER LAS PIEZAS DE TRABAJO" ('Improvements in Hand Clamps and Pullers to Increase Seizure and Support Workpieces');

Exp. 167,236-P
Filing date: Nov. 30, 1976
"MEJORAS EN CONJUNTOS DE TORNILLOS DE DOS VELOCIDADES CON MULTIPLICACION DE FUERZA AXIAL" ('Improvements in Two-Speed Vises Multiplying Axial Force').

Duly certified copies of these applications furnished by the Mexican Patent Office (Direccion General de Invenciones y Marcas) are attached.

SUMMARY OF THE INVENTION

1. Background

In mounting and securing a hub on a shaft it is desirable for the hub to move easily into its intended location on the shaft; once there, to be quickly and positively secured in place; and at any later time to be easily and quickly disengaged from the shaft. The common solution to this need is to provide a tapered bushing having a cylindrical bore slightly greater than the shaft diameter, the bushing being split lengthwise; a matching tapered bore in a separate hub member is then drawn over the bushing to compress it tightly on the shaft, thus providing the equivalent of a shrink-fit seizure of the hub on the shaft; when the hub is to be removed, the hub is pressed axially off the conical bushing by setscrews, hopefully allowing the latter to expand and disengage from the shaft. This arrangement has a number of drawbacks: the bushing, generally of cast iron, has a thin web at the keyway and may be readily breakable; the bushing generally remains in place while the hub is drawn up on it, causing disalignment of the hub and trial-and-error mounting; axial movement to be provided by a setscrew is often incompetent to break hub seizure; the assembly requires multiple machining of the mating parts, increasing cost and warehousing requirements. The screws used to draw the hub up-cone or to push it down-cone lie parallel to the shaft bore and require axial clearance on at least one face of the hub for manipulation, increasing the over-all length required for the installation and presenting difficulties of access.

These and other drawbacks and complications leave something to be desired: a better hub mount.

2. Objects of the invention

The definitive hub mount should be of one piece, with simple machining, to make it economical in first cost and unbreakable; it should be free from axial creep when being tightened; it should be able to be tightened quickly and positively where located; it should provide a very tight grip on the shaft; it should be readily loosened for removal; securing and releasing the hub should be effected by means of access normal to the shaft, both for convenience of manipulation and to obviate designing in costly additional shaft length for mere clearance to provide axial access.

These and other desirable characteristics are provided in the present invention, one of the objects of which is to create a one-piece hub which may be integral with a pulley, sprocket, gear, coupling, impeller, or any other member to be mounted on the shaft, yet adjustable to seize or release the shaft as desired.

Another object of the invention is to provide an integral hub produced by simple and easily performed machining.

A further object of the invention is to provide a hub the bore of which is readily made to contract or to enlarge sufficiently to seize and to release a shaft placed in said bore.

A still further object of the invention is to provide a seizure by means of a compact screw assembly applying great mechanical advantage in the stress of contraction or expansion of hub bore.

Yet a further object of the invention is to enable the actuation of the seizing and releasing function by means of a wrench which does its work in a few seconds.

Still another object of the invention is to provide an embodiment in which actuation of the seizing and releasing function by means of tool access is by generally radial approach which eliminates blind groping and obviates any need for allowing axial clearance on either axial face of the hub.

Another object of the invention is to provide an alternative embodiment in which tightening and releasing manipulation may be applied on one hub face, and still another embodiment in which such manipulation may be applied at will upon either face of the hub.

One more object of the invention is to provide embodiments suited for hub members made of light metals and of other materiales affording slight opposition to elastic deformation.

An additional object is to provide an embodiment of a one-piece locking and releasing hub for use where a very small hub outer diameter is required and where axial access is preferred for the locking operation.

A principal object is to provide a specialized screw assembly for producing an intensified mechanical advantage employed in the embodiments disclosed in this specification primarily for producing elastic deformation of hub throat stock.

A further major object is to provide novel thrusting, seizing, clamping and releasing mechanisms the scope of useful applications of which, though employed in an optimum manner in locking and releasing hubs, may extend far beyond the field of hubs and the like.

These and other objects accomplished by this invention will be more fully understood and appreciated in reading the following description of the invention, which refers to the accompanying drawings, in which:

BRIEF DESCRIPTION OF THE DRAWINGS

FIG. 4 shows a portion of a pulley in axial cross-section.

FIG. 5 shows a portion similar to that of FIG. 4 in a different embodiment.

DETAILED DESCRIPTION OF THE INVENTION

Figure 1:
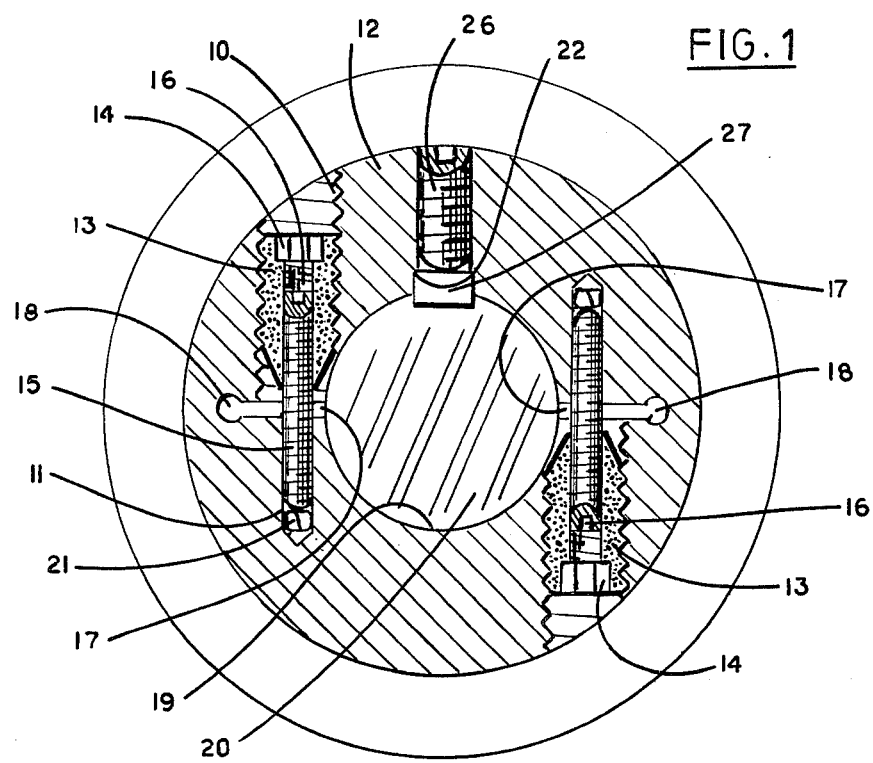
FIG. 1 shows a hub, typically of a V-belt pulley or the like, in elevation in section through bottom of the sheave or through collar.

FIG. 1 shows a first preferred embodiment of the invention, represented for convenience as a V-belt pulley although applicable to any member mountable on a shaft, rod, bar or the like. The pulley body shown in cross-section transverse to the shaft bore 19 has a preferably radial slot 17 extending from shaft bore 19 into pulley body 12 and terminating in a keyhole shape 18; slot 17 may extend axially from end to end of pulley body or be of less extent. Substantially normal to slot 17 and almost tangent to bore 19 is a tapped screwhole 11 extending downward from slot 17 and either teminating blind within the hub body 12 or continued to pulley body surface. Upward from slot 17 a concentric but larger tapped screwhole 10 extends to the surface of pulley body 12. Lower and smaller screwhole 11 is occupied by headless screw 15 having wrench socket 16 adapted to receive a wrench; screw 15 is bottomed against a lockwasher 21 or other device to immobilize it, or simply driven into the unfinished threads at bottom of screwhole 11 so as to lock it against rotation. Larger upper screwhole 10 is occupied by sleeve screw 13 having external and internal threads of slightly different pitch, the outer threads engaging tapped screwhole 10 and internal threads engaging threads of screw 15, sleeve screw 13 being preferably tapered at lower end as shown, and having wrench socket 14 in its upper end.

Because of the difference in pitch of the threads, when sleeve screw 13 is rotated it advances axially slightly farther along one thread than along the other, and hence applies a highly multiplied upward or downward thrust upon enveloped non-rotating screw 15; since the latter is immobilized in the portion of pulley body 12 below slot 17, an upward thrust tends to contract slot 17 and reduce the effective diameter of pulley bore 19 making it seize shaft 20 with a shrink-fit grip; similarly a downward thrust upon screw 15 tends to expand slot 17 and cause hub bore 19 to release seizure of shaft 20. If for example there are eleven threads per inch on screw 15 and in bore 11, and ten threads per inch in screwhole 10, then one full rotation of sleeve screw 13 will cause it to advance 1/10 inch along screwhole 10, and 1/11 inch along shaft of screw 15; it will thus in one rotation carry screw 15 bodily on axial distance equal to the difference, that is, 1/110 inch or 0.0091", with a multiplication of the mechanical advantage of thrust of some 1000% over that available if the same torque were applied to a plain screw. Since relatively long spiral travel in the threads is involved, unit thread stress is not comparably increased.

If a plurality of coaxial screwholes 10 and 11 with respective sleeve screws 13 and screws 15 cooperating across slots 17 are provided in a single hub, the seizing and releasing effect of pulley bore 19 on shaft 20 is more than proportionately increased; on a relatively long pulley or other member mounted on a shaft, a plurality of sets of such screwholes and screw assemblies extending along the length of the member or at both ends may be indicated.

Displacement of hub bore stock between the conditions of shrink-fit seizure and of shaft release is minute but significant, well within the range of elastic deformation and recovery of the portions of hub body 12 involved. Relatively little contraction of bore 19 can occur after intimate seizure contact is produced with shaft 20, and increasing seizure tension therebeyond produces principally the stock compression typical of a shrink fit. The action is readily achieved with the multiplied thrust provided by the compound differential screw assemblies. Slot 17-18 may be filled with an elastic sealant such as asphalt for drum-type pulleys or the like to be sealed from the atmosphere.

Figure 2:
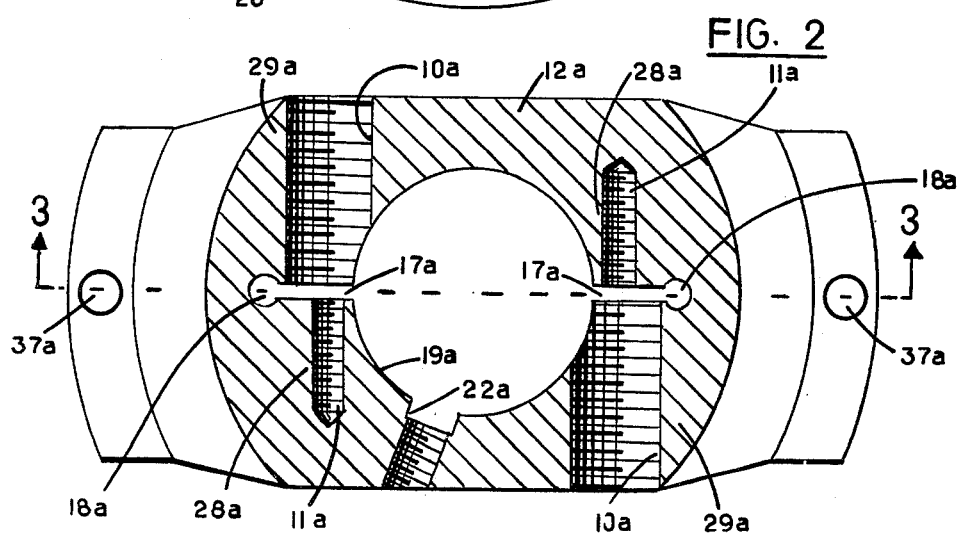
FIG. 2 shows a hub of one member of a flexible coupling assembly in cross section.
Figure 3:
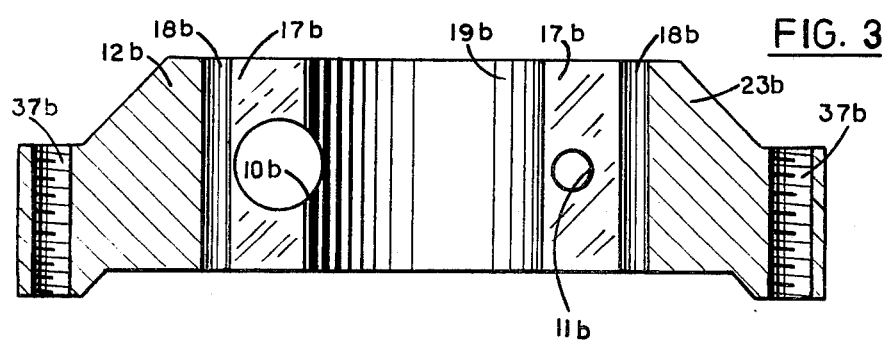
FIG. 3 shows the same hub of FIG. 2 in cross-section transverse to that of FIG. 2.

FIGS. 2 and 3 represent in different views one member of a flexible coupling assembly of "universal" type in which two optionally identical members are mounted on opposed ends of two shafts to transmit rotation, while permitting deviation, through a flexible intermediate member or other suitable interposed member. The mounting disposition shown in FIGS. 2 and 3 is essentially similar to that shown in FIG. 1. It is evident in FIG. 2 that compression of slot 17a/18a will occur in this construction mainly through lateral contraction of body 12-a, portion 29-a being drawwn closer to portion 28-a of said hub body 12-a, and that in expansion mode the said portions are thrust farther away from each other to expand hub bore 19-a. Screwholes 10-a and 11-a are shown unoccupied, indicating that threads in blind end of 11-a die out to permit seizure of screw 15-a turned thereinto without other locking provision. Tapped screwholes 37-a/37-b for receiving screws clamping the flexible ring member may be replaced by other suitable coupling elements.

FIG. 4 represents a cross-section through a pulley along its axis to show slot 32-c as an annular internal hollow enlargement or generally conical slot within the body of hub 12-c coaxial with hub bore 19-c; screw 15-c extends across said annular slot 32-c and is threaded into screwhole 11-c tapped in hub body portion 28-c forming one collar of hub, while the opposite end of screw 15-c is threaded into an internally threaded bushing 30-c occupying a coaxial larger smooth bore 31-c countersunk into hub body portion 29-c forming the opposite hub collar, bushing 30-c being bottomed in counterbore 31-c and immobilized therein by suitable means such as spotweld 36-c, or by transverse setscrew, pin or the like. In this embodiment screw 15-c presents two separate successive lengths of thread, the pitch thereof being proximate but distinct. Screw 15-c is assembled as shown in bushing 30-c before spotwelding or otherwise immobilizing bushing 30-c. Wrench socket 16-c may be provided as shown in either end or both ends of screw 15-c, in the latter case permitting take-up and release actuation from either or alternate faces of hub. Because of differential pitch, rotation of screw 15-c in one direction will draw opposite hub collars 29-c and 28-c toward each other forcibly, producing contraction in hub bore 19-c in each collar by virtue of the conical cross-section of the respective hub body portions 29-c and 28-c, a choke action of each collar section upon shaft 20-c. Opposite rotation of screw 15-c will tend to distend collars. A plurality of screw assemblies 15-c with 30-c will multiply the seizing effect. Vibration and repetitive stress cannot loosen screw 15-c because of its seizure in different threads.

The embodiment of FIG. 4 as illustrated involves manipulation to lock or release hub on shaft performed on either hub face, rather than with manipulation applied in a generally radial direction as in FIGS. 1–3; such access is preferable in certain applications. It provides simultaneous/seizure of shaft 20-c by both collar portions 28-c and 29-c. Where preferred, collar portions 28-c and 29-c may be of unequal thickness, in which case seizing action is typically more pronounced in the thinner portion.

FIG. 5 represents a hub having an internal annular slot 32-d similar to that of FIG. 4 with a scrww 15-d extending from collar portion 29-d to 28-d, wherein a screw assembly similar to that of FIG. 1 is mounted, screw 15-d being immobilized in screwhole 11-d and threaded into internal threads of sleeve screw 13-d which is in turn threaded into tapped bore 10-d. As in FIG. 1, rotation of sleeve screw 13-d causes it to travel different relative distances along its internal and external threads because of differential pitch and hence to apply a force which in one direction of rotation forcibly draws collars 29-d and 28-d closer and hence produces choke and seizure, and in the opposite direction tends to distend said collars.

As in the case of FIGS. 1, 2 and 3, sleeve screw 13-d is first screwed to its approximate final neutral position, and screw 15-d is then turned through it; as screw 15-d mates with threads in screwhole 11-d, some slight rotation of sleeve screw 13-d may be needed for its internal threads to coincide with those of screwhole 11-d, permitting screw 15-d to advance until it bottoms and locks in screwhole 11-d. At this stage no choking and no distending force is being applied. Sleeve screw 13-d is then turned to left or right to produce the seizing and releasing effects hereinabove described.

The force-multiplying screw assemblies disclosed in FIGS. 1 and 5 comprise a minimum of four elements: a screw 15, an enveloping sleeve screw 13 having different but proximate thread pitch between its inner and outer coaxial surfaces, a threaded bore 10 enveloping sleeve screw 13 and a threaded bore 11 enveloping end portion of screw 15, the body portions of the hub surrounding said bores 10 and 11 being susceptible of movement relative to each other generally along the axis of screw 15. The thrust-multiplying capability of the screw assembly in employed to produce a significant change in hub bore dimensions or geometry by means of a relatively easy and instantaneous twist of a wrench, at will.

The force-multiplying screw assembly disclosed in FIG. 4 likewise comprises a minimum of four elements: a screw 15-c having two successive threaded lengths with differential pitch, a bushing or sleeve 30-c internally threaded, a bushing bore 31-c preferably having a seat or neck against which bushing 30-c may bear, wherein it may be immobilized as by spotweld 36-c joining bushing 30-c to hub portion 29-c, a hub body portion 28-c enveloping end portion of screw 15-c in screwhole 11-c, the two hub body portions 29-c and 28-c being susceptible of slight relative movement along the axis of screw 15-c in response to thrust produced by the screw assembly.

The hub body is so conformed that the said small relative movements between hub body portions provide positive clamping or releasing action of hub bore upon shaft inserted therein.

Screw assemblies shown in FIGS. 4 and 5 including respective screwholes 11-c, 31-c and 10-d, 11-d into the conventional hub structures with mating conical structures, to provide increased axial thrust and positive locking and releasing of hub on shaft.

Figure 6:
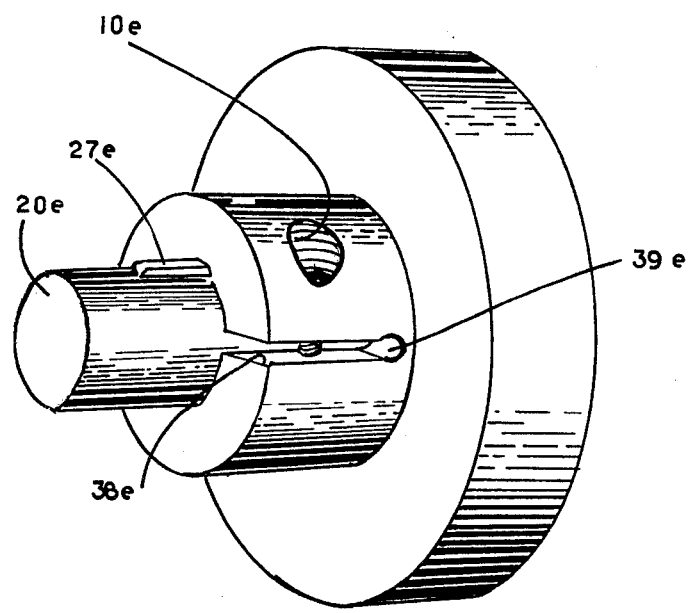
FIG. 6 shows in perspective still another embodiment of a contractile hub seizing a shaft.
Figure 7:
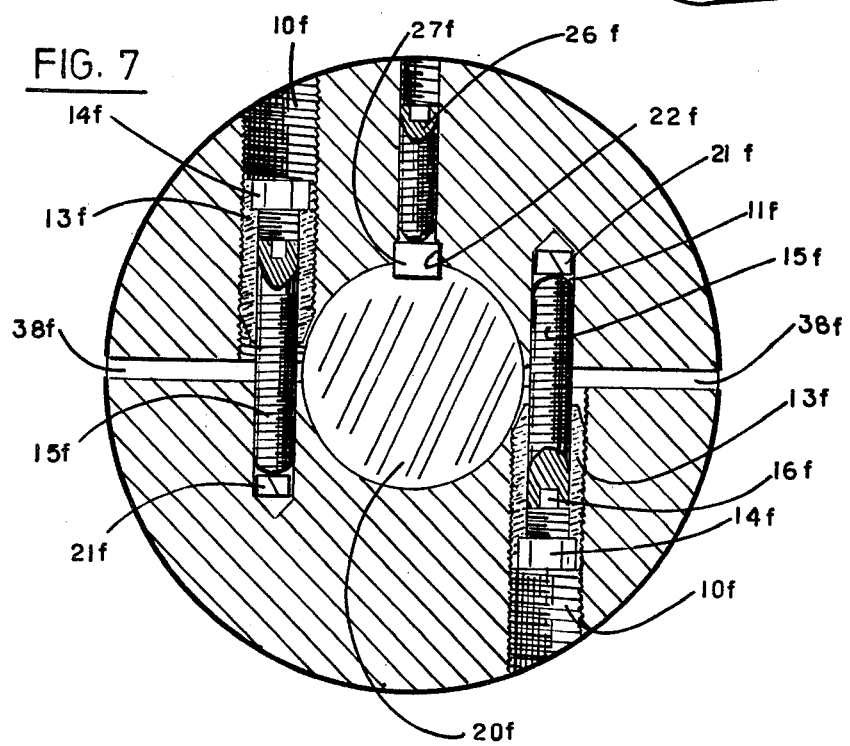
FIG. 7 shows cross-section of the hub of FIG. 6.

Again, the slot may, as shown in FIG. 6, be a diametral slot extending across the end of the hub, with a screw assembly such as shown in FIGS. 4 or 5 placed transverse to the slot and generally tangent to the hub bore, to produce intensified force for compression or expansion of the slot for seizing or releasing hub on shaft. The diametral slot extending to outside of hub is old, but application thereto of the screw assemblies herein disclosed constitutes a novel combination with improved performance and affords distending as well as compressing action.

FIG. 4 may also represent a locking hub made of a more elastic material such as wood, aluminum, plastic and the like in which a simple headed screw replaces screw 15-c and bushing 30-c; head of screw bears against the seat in counterbore 31-c while its threaded stem screws forward in screwhole 11-c, applying moderate tension for drawing collars 29-c and 28-c closer together and hence cramping them against shaft 20-c by virtue of annular conical slot 32-d. FIG. 1 may similarly be so interpreted if bore 10, which need not be tapped, carries a seat or reduction above slot 17.

The hub, again, may be stationary member, wherein the constructions above indicated are used to mount a lever, grip, handwheel, stop member or the like upon a rod, bar, shaft, pipe or other mechanical component or wherever a seizing or releasing collar action may be used, whether normally immobile or having any other movement such as gyratory, reciprocating, or any combination of travel or articulation.

MANNER OF MAKING AND USING

This invention does not involve nor require new manufacturing methods. The lengthwise radial slots extending from hub bore into hub body as in FIGS. 1, 2 and 3 may conveniently be made by first drilling a small hole lengthwise of the hub body where the outer end 18 of the keyhole slot is to be located. Then slot 17 may be completed by sawing or broaching starting from the inner wall of the hub bore and extending the kerf in a generally radial direction to hole 18 previously drilled. In die-casting, shell-casting and similar conventional processes it is frequently possible to incorporate the distinctive slots of the present invention in the original mold, matrix or core. Annular conical enlargement or slot 32-c/d in FIGS. 4 and 5 can readily be provided in the original core, matrix or mold in cast hubs, and machined into members turned from the solid. For slots of FIG. 6, drilling, sawing and broaching is readily performed.

Drilling and tapping the screwholes and stepped holes for the screw assemblies is done with universally known shop techniques. The manufacture and threading of screws, sleeve screws and tapped bushings does not require modification over known processes.

The methods of mounting the various screw assemblies has already been discussed above. The methods for placing, shrink-fit mounting and releasing hubs on shafts has also been described in adequate detail for purposes of the present specification. The immense range of practice availabe to numerous embodiments of the present invention makes it impracticable to attempt exhaustive description within the present space.

OBJECTS FULFILLED

All of the objects enunciated for the invention at the beginning of the present specification are achieved in the mechanisms and uses above disclosed, and are touched on again in the claims which follow.

SCOPE

Because of the indefinitely large number of members which are mounted upon shafts, axles and spindles to transmit thereto or to receive therefrom rotation or interrupted rotation, and other members which are mounted on shafts, bars, rods tubes and the like some of which may be non-rotary and may have any or no other movement, the foregoing description of the present invention is drawn to a hub member such as a pulley or the like while clearly extending its scope and teaching to the relatively large number of applications that will be found to exist. The scope of this invention is therefore not restricted by the foregoing description but has the extent of the following claims.

I claim:

1. A one-piece hub which is optionally integral with a pulley, gear or other working member, having a body and a bore of variable effective diameter within narrow limits and adapted for seizing and releasing a shaft inserted into said bore, said hub bore having slots which are contractile and expandable and extend radially from said hub bore and said hub body and lengthwise of said hub bore, said slots terminating in a preferably rounded shape, extending lengthwise of the said hub and being traversed by tapped screw-holes generally perpendicular to said slots and approximately tangent to said hub bore, each screwhole having one tapped diameter on one side of said slot and a larger coaxial tapped diameter on the opposite side of said slot extending to a surface of said hub body, the pitch of the threads in the said two diameters of screwhole being substantially similar, the smaller diameter hole containing a headless screw turned thereinto and means locking said headless screw against rotation, said headless screw extending across said slot a sleeve screw having internal threads engaging said headless screw and having external threads engaging the threads in the larger coaxial screwhole, said sleeve screw having a socket on its outer end adapted for wrench engagement and a tapered inner end, said sleeve screw being adapted for simultaneous advance in its external threads and its internal threads when rotated, the compound differential pitch action depending upon differential advance of said sleeve screw along its inner and outer threads respectively, and being adapted to produce multiplied mechanical advantage in the contraction of said hub slot in one direction of rotation of said sleeve screw producing seizure of said hub bore upon said shaft placed therein, and expansion of said hub slot with the opposite rotation of said sleeve screw, whereby powerful expansion of said hub bore results from expansion of said slot and said shaft is thereby disengaged from said hub bore.

2. A hub as set forth in claim 1 further including one or more radial slots extending from the hub bore thereof into hub body lengthwise of said hub bore, a screwhole substantially perpendicular to said slot and substantially tangent to said hub bore, a smallest tapped diameter below said slot, a larger tapped diameter above said slot and a still larger unthreaded coaxial diameter thereabove extending to the hub body surface, transition from largest untapped diameter to the intermediate diameter forming a step against which the head of a machine screw can bear when its threaded shank is screwed into said smallest diameter screwhole below said slot, tightening of said machine screw tending to draw hub body portions above and below said slot toward one another, and said intermediate threaded diameter permitting introduction of a setscrew thereinto to bear across said slot and tend to thrust the two said hub body portions apart, to provide alternative clamping and releasing action of said hub upon a shaft placed therein.

3. A one-piece hub having a contractile and expandable bore adapted to receive a shaft therein and seize it for operation and release it for removal, said hub bore presenting a coaxial internal annular slot tapered toward each face of said hub, each face of said and adjoining bore section constituting a collar closing the said annular internal enlargement, with screwholes parallel to said shaft and bore passing through one collar and coaxially through the opposite collar, said screwholes presenting a smaller tapped diameter in one collar and a larger tapped diameter of different but proximate pitch in the opposite collar, a screw engaging said smaller diameter and means in the threads locking said screw which extends across the annular internal space within said hub and into the larger coaxial tapped diameter in the opposite collar a sleeve having internal threads engaging said screw external threads engaged in the threaded bore of the larger diameter hole in said second collar, the said sleeve having a socket in its outer end adapted to receive a wrench, said sleeve when rotated by such wrench being adapted to simultaneous travel along its internal and external threads at a differential rate dependent upon the compound differential pitch of its inner and outer threads, contraction of the said collars upon said shaft placed therein, in consequence of screw action drawing said collars toward each other as said sleeve produces multiplied axial thrust, being adapted to provide seizure of said shaft, and expansion of said collars by the reverse action of said screw producing release of said shaft.

4. A hub as set forth in claim 2 further including a coaxial internal annular slot tapering toward each face of said hub, at least one screwhole parallel to the shaft bore passing through one collar and coaxially through opposite collar, such screwholes presenting a small diameter threaded portion in one collar and an intermediate diameter threaded portion in the inner portion of opposite collar and a still larger coaxial unthreaded portion in an outer face of said latter collar, transition from the largest unthreaded diameter to the intermediate threaded diameter forming a step or neck against which the head of a machine screw will bear when its shank is drawn up tight in the opposite small-diameter screwhole, tending to draw said opposite collars toward each other, and the intermediate diameter threaded screwhole permitting insertion of a screw which will tend to thrust two said hub collars apart for clamping and releasing action of hub on shaft, with optional segmental radial slots in said collars to increase clamping action.

5. A one-piece hub having a contractile and expandable bore adapted to receive a shaft therein seized for operation and released for removal, said hub bore presenting a coaxial internal annular slot or hollow enlargement preferebly tapered toward each face of said hub, each face of said hub and bore thus constituting a collar closing the said annular enlargement on its respective side of the hub, screwholes parallel to said hub bore passing through one collar and coaxially through the opposite collar, said screwholes presenting a smaller tapped diameter in one collar and a larger diameter with a counterbore in the opposite collar forming two stepped and successively larger diameter bores, a portion of the largest diameter intersecting the surface of the conical annular hollow enlarged portion of the hub bore, said largest diameter being occupied by a bushing internally threaded and engaging a screw which extends across the annular space of the hub bore and is threaded into the small tapped bore in the opposite collar, the said bushing bearing against the counterbore and means immobilizing said bushing in its position in the largest bore, the said screw having in one portion of its length one thread matching that of the bushing in which it is threadedly engaged, and toward its other end a thread having a different pitch threaded into the said smaller tapped bore in the opposite collar, the said screw having a socket adapted to receive a wrench preferably in each of its ends, such that the rotation of the said screw in one direction applies a multiplied tractive effort tending to draw the respective collars housing the smaller threaded bore and the larger bore containing the bushing toward one another and the arching internal structure of the said hub surrounding the said annular space being such that the inwardly drawing action tends to contract said hub collars upon said shaft placed therein, and such that rotation of said screw by said wrench in the opposite direction tends to relieve such contraction and to enlarge said collar bores.

6. A compound differential pitch screw assembly for a hub having first and second body portions comprising a threaded bore in a first body portion, a headless screw engaged in said threaded body portion being capable of limited movement or deformation under thrust generally in a direction along the axis of said screw relative to the second body portion in which a larger threaded bore coaxial with said bore in said first body portion has a sleeve having external threads engaging threads in said larger threaded bore and having in its bore internal threads of different pitch engaging threads on said headless screw extending thereinto, said sleeve having an end socket adapted to be engaged by a wrench inserted therein, said sleeve being rotated by such wrench and thereby advancing simultaneously along its external threads in said larger threaded bore in said second body portion and along its internal threads engaging said headless screw, such differential advance by said sleeve along its said inner and outer threads producing axial travel of said headless screw proportionate to the pitch difference and travel of said first body portion in which it is immobilized relative to said second body portion with multiplied axial thrust consequent upon relatively long rotary travel of said sleeve for minuscule consequent axial movement so produced.

7. A compound differential pitch screw assembly for a hub having first and second body portions comprising a threaded bore in a first body portion, a screw engaged in said threaded bore said first body portion being capable of movement under stress generally along the axis of said screw relative to the second body portion which has a larger diameter bore coaxial with the bore in said first body portion a bushing in said larger diameter bore and having a tapped bore into which said screw is threaded, said screw having tandem lengths of its shank provided with threads of two different pitches, the thread of said screw engaging the tapped bushing bore being of a different pitch than the thread of said screw engaging the tapped bore in said first body portion, means securing said bushing in said larger diameter bore, said screw having a socket in one of its ends adapted to receive a wrench, displacement of said first body portion relative to said second body portion which is accomplished through a limited rotation of said screw being effected by means of high mechanical advantage dependent upon compound differential pitch rotation of said screw when rotated by the wrench externally applied.

8. In a hub having a diametral slot extending transversely across an end of said hub and extending a limited distance axially inward from the end of said hub, the provision of one or more screwholes perpendicular to and extending across said diametral slot a smaller diameter threaded screwhole below the slot and a larger diameter threaded screwhole above the slot a sleeve screw enveloping the upper end of a headless screw threaded into said sleeve screw and extending across the said diametral slot, said sleeve screw being threaded into and immobilized in said larger screwhole above said slot, said sleeve screw having a socket on its upper end adapted to receive a wrench and preferably tapered at its opposite end to preclude extending into the shaft bore of said hub, outer and inner threads of said sleeve screw being of different pitch such that rotation of said sleeve screw produces multiplied thrust with appreciable mechanical advantage to compress said diametral slot and cause the hub to seize upon a shaft placed therein or when oppositely turned to expand slot and release such shaft.

* * * * *